(12) United States Patent
Hunt

(10) Patent No.: US 7,660,981 B1
(45) Date of Patent: Feb. 9, 2010

(54) VERIFIABLE CHAIN OF TRANSFER FOR DIGITAL DOCUMENTS

(75) Inventor: Bruce Hunt, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 673 days.

(21) Appl. No.: 11/001,711

(22) Filed: Nov. 30, 2004

(51) Int. Cl.
*H04L 9/32* (2006.01)
*G06F 7/04* (2006.01)
*H04L 29/06* (2006.01)
*G06F 17/00* (2006.01)

(52) U.S. Cl. ............................ 713/156; 713/175; 726/5; 726/10; 726/18; 726/19

(58) Field of Classification Search .................... 726/10
See application file for complete search history.

(56) References Cited

U.S. PATENT DOCUMENTS

| | | | |
|---|---|---|---|
| 5,850,520 A | 12/1998 | Griebenow et al. | |
| 5,996,076 A * | 11/1999 | Rowney et al. | 713/156 |
| 6,237,096 B1 * | 5/2001 | Bisbee et al. | 713/178 |
| 6,367,013 B1 * | 4/2002 | Bisbee et al. | 713/178 |
| 6,728,880 B1 | 4/2004 | Sites | |
| 6,760,752 B1 * | 7/2004 | Liu et al. | 709/206 |
| 6,792,536 B1 * | 9/2004 | Teppler | 713/178 |
| 6,898,709 B1 * | 5/2005 | Teppler | 713/178 |
| 6,990,684 B2 * | 1/2006 | Futamura et al. | 726/18 |
| 7,162,635 B2 * | 1/2007 | Bisbee et al. | 713/176 |
| 7,185,362 B2 * | 2/2007 | Hawkes et al. | 726/4 |
| 7,197,637 B2 * | 3/2007 | Schmidt et al. | 713/157 |
| 7,310,732 B2 * | 12/2007 | Matsuyama et al. | 713/176 |
| 7,310,821 B2 * | 12/2007 | Lee et al. | 726/27 |
| 7,580,988 B2 * | 8/2009 | Rudd | 709/217 |
| 2003/0149668 A1 * | 8/2003 | Lee et al. | 705/51 |

OTHER PUBLICATIONS

Zhang, N. Shi, Q. Marabti, M. "Anonymous Public-Key Certificates For Anonymous And Fair Document Exchange". IEEE Proceedings on Communications. Pub: Dec. 2000. Relevant pp. 345-350. Found on the World Wide Web at: http://ieeexplore.ieee.org/stamp/stamp.jsp?tp=&arnumber=903348&isnumber=19549?tag=1.*

(Continued)

*Primary Examiner*—William R Korzuch
*Assistant Examiner*—Jeremiah Avery
(74) *Attorney, Agent, or Firm*—Fish & Richardson P.C.

(57) ABSTRACT

Methods and apparatus, including computer systems and program products, related to techniques for creating a chain of transfer for a digital document in which every transferor and transferee participates in the transfer. A first entity, e.g., an offeror with current control of the document, generates an offeror certificate associated with the digital document, and encrypts the offeror certificate with the offeror's private key. The offeror transmits the encrypted offeror certificate to a second entity, e.g., an offeree that will be the subsequent controller of the document. The offeree generates an offeree certificate from the offeror certificate, encrypts the offeree certificate with the offeree's private key, and transmits the encrypted offeree certificate to the offeror. When the offeror receives the offeree certificate, the offeror adds the offeree to a chain of transfer for the document and generates a transfer certificate for the offeree.

62 Claims, 2 Drawing Sheets

OTHER PUBLICATIONS

"Home:Public-Key Cryptography Standards (PKCS) PKCS #1: RSA Cryptography Standard", RSA Laboratories, http://www.rsasecurity.com/rsalabs/node.asp?id=2125.

R.L. Rivest et al., "A Method for Obtaining Digital Signatures and Public-Key Cryptosystems", Massachusetts Institute of Technolgy.

"Diffie-Hellman key exchange", Wikipedia, the free encyclopedia, http://en.wikipedia.org/wiki/Diffie-Hellman_key_agreement.

"Multiple Electronic Signatures on Multiple Documents", Antonio Lioy and Gianluca Ramunno, Politecnico di Torino, Dip. Di Automatica e Informatica, Torino (Italy), 12 pages.

* cited by examiner

VERIFIABLE CHAIN OF TRANSFER FOR DIGITAL DOCUMENTS

BACKGROUND

The present application relates to creating a chain of transfer for a document in which every transferor and transferee participates in the transfer.

When digital documents, such as files and digital images, are created the documents can have associated document information, e.g., a set of document properties for the document. The document properties include an identifier or name of an author of the document, and an organization associated with the document. Document properties can also include statistics related to the document, such as a date that the document was created, modified, or printed. The statistics can also include an identifier or a name of a user who saved the document, and a file size of the document.

SUMMARY

The present invention provides methods and apparatus, including computer program products, that implement techniques for creating a chain of transfer for a document in which every transferor and transferee participates in the transfer. A first entity, e.g., a transferor with current control of the document, generates a first entity certificate associated with a digital document, and encrypts the first entity certificate with a private key of the first entity. The first entity certificate can include a chain of transfer, which identifies each of the previous controller(s) of the document. The first entity certificate can also include conditions of an offer for transference of control of the document and a unique identifier for the document, e.g., a unique hash. The first entity transmits the encrypted first entity certificate to a second entity, e.g., a transferee that will be the subsequent controller of the document. The second entity receives the first entity certificate, generates a second entity certificate from the first entity certificate, encrypts the second entity certificate with a private key of the second entity, and transmits the encrypted second entity certificate to the first entity. When the first entity receives the second entity certificate, the first entity adds the second entity to a chain of transfer for the document and generate a transfer certificate from the second entity certificate. The first entity encrypts the transfer certificate with the first entity's private key and transmits the transfer certificate to the second entity.

The transfer certificate can include the encrypted second entity certificate, thereby making the transfer certificate verifiable with a public key associated with the private key of the first entity and a public key associated with the private key of the second entity.

The first entity certificate can also include information encrypted with the private key of each the previous controllers of the document, making the chain of transfer verifiable with public keys associated with the private keys of the first entity and each of the previous controllers of the document. The first entity certificate can also include a previous transfer certificate encrypted with a private key of a previous controller of the document, and the previous transfer certificate includes a previously approved transfer certificate encrypted with the private key of the current controller.

The term "document" refers to a set of electronic data, including both electronic data stored in a file and electronic data received over a network. A document can, but does not necessarily, correspond to a file. The document can be stored in a portion of a file that holds other documents in a single file dedicated to the document in question, or in a set of coordinated files.

A "controller" of a document refers to a person or entity that has control rights in the document. The control rights can include ownership rights in the document. The control rights can also include provisions on usage, copying (e.g., whether copies can be made, or a limit on the number of copies made), transfer of the document (e.g., a document may be transferred up to a maximum number of times), and possession of a copy of the document.

The techniques described in this specification can be implemented to realize one or more of the following advantages. For example, the technique can provide a verifiable chain of transfer for the document. The chain of transfer can be publicly provable and allow for exclusive and non-exclusive transfers. The chain of transfer of the document cannot be forged or repudiated without the authorization of the controller of the document. The chain of transfer of the document can include information to show agreed-upon conditions of document transfers, such as ownership, usage rights, and titles. The disclosed techniques can enhance conventional techniques for proving the authenticity of provenance chains, such as digital signatures. A disclosed process with bi-directional interaction between a current controller of the document and a subsequent controller of the document can link information relating to both controllers in the chain of transfer record for the document.

Details of one or more implementations are set forth in the accompanying drawings and in the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Digital documents, such as files and digital images, can pass from one controller to another in a "chain of transfer". A chain of transfer refers to a record of the transfers and associated usage rights for a document.

The present disclosure describes techniques for providing chain of transfer information for digital documents. An offeror in current possession of a document can offer the document to an offeree along with certain terms and conditions of use and/or transfer of the document. If the offeree approves of the terms and conditions of the offer, then the offeror can encrypt the offer and the agreed-upon conditions and return the encrypted approved offer to the offeree. In doing so, the offeror can add the offeree to the chain of transfer for the document, and the chain of transfer can be made publicly verifiable by others. The chain of transfer also allows rights in the document to be traced from a current owner back to an originator of the document. The disclosed techniques can enhance conventional techniques for proving the authenticity of provenance chains, such as digital signatures and the age of the media.

In some circumstances, it may be useful to have proof of past ownership for a document. For example, a current owner of a digital image, such as an art collector, may want to prove that the image is an original image that came from an original owner, e.g., the artist. The current owner of the digital image may also want to prove ownership rights to the image, and may want the ability to prove the identity of the previous intervening owners of the document.

Using the chain of transfer, a current controller of a document can prove that the controller has a legitimate copy of the document, and former controllers of the document can publicly prove that they previously had control of the document at some point. The chain of transfer can reveal the agreed-upon conditions of the document transfer or usage for one or more document controllers in the record for the chain of transfer. Optionally, the rights of the controller to the document may be determined or regulated by the owner of the document.

Figure 1:
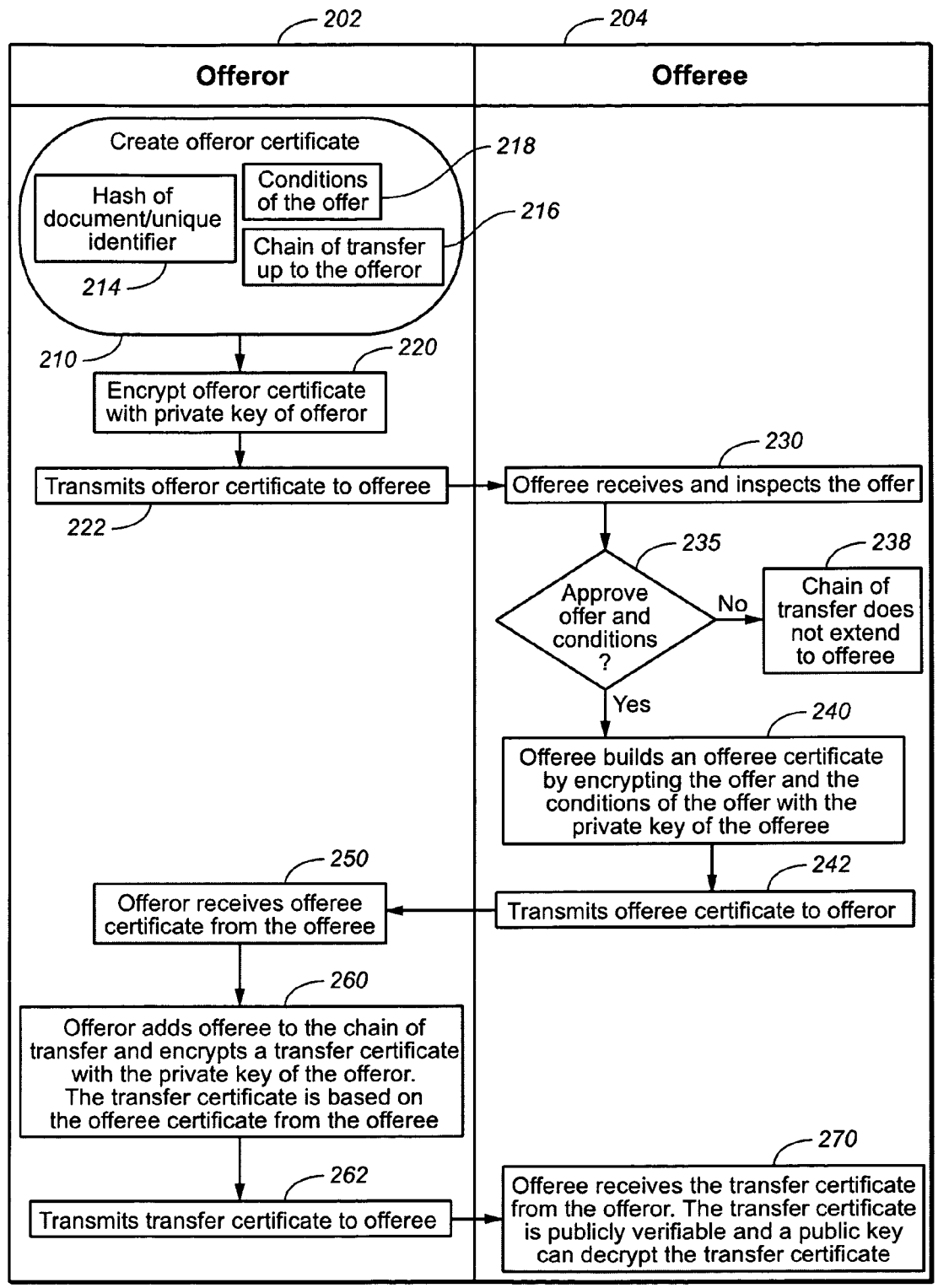
FIG. 1 illustrates a process for a chain of transfer for a document.

FIG. 1 illustrates a process for a transfer of control of a document from one entity, which can be a person, a company or other organization, or a device, to another entity. A controller entity is the offeror 202 or transferor and a subsequent controller entity is the offeree 204 or transferee. Each entity has an associated private and public key pair. The offeror 202 creates an offer (block 210) that includes an identifier of the document 214, and a representation of the conditions and controls of the offer 218, as well as a representation of the chain of transfer 216. The chain of transfer in the offeror certificate extends up to the offeror. In one implementation, the offer also includes the document. The offeror 202 encrypts the offer with the offeror's private key (block 220). The offer is transferred to the offeree (block 222). The offer sent in the first transfer 222 can also have information identifying the offeror 202, as well as the chain of transfer of the document. The offeree 204 receives and decrypts the offer using the offeror's public key and inspects the offer (block 230). If the offeree 204 does not approve of the terms and conditions of the offer (block 235), the offeree 204 is not provided with control of the document because the offer has been declined, and the chain of transfer does not extend to the offeree (block 238).

If the offeree 204 approves of the offer (block 204), the offeree creates an offeree certificate (block 240) by encrypting the offer and the conditions of the offer with the offeree's private key and sending the offeree certificate back to the offeror (block 242). The offeror 202 receives the offeree certificate from the offeree (block 250). The offeror encrypts a transfer certificate with the offeror's private key (block 260) and sends the transfer certificate to the offeree 204 (block 270). The transfer certificate is publicly verifiable by anyone using the public keys of the offeror and offeree to decrypt the transfer certificate. By using the private key of the offeree 204 in building the offeree certificate (block 240) and the private key of the offeror 202 in encrypting the transfer certificate (block 260), the exchange between the offeror 202 and the offeree 204 with the offer of the document and the associated approved conditions are effectively linked in the chain of transfer information.

The techniques disclosed in FIG. 1, the sequence of transfers, and/or the encryption and decryption schemes may vary from the orders described. For example, in one implementation the offer is not encrypted prior to the first transfer 222. The public key to be used to decrypt the transfer certificate of the third transfer 262 may be stored in a database to be accessed by one or more database users, and/or the public key may be transferred along with the transfer certificate in the third transfer 262. In another implementation, the created offer (block 210) can include other information, such as the time and date the offer was created, information regarding the chain of transfer, control information associated with former controllers, and information associated with the original creator or controller of the document.

In one implementation, when the offeror 202 creates a transfer certificate (block 260), the transfer certificate includes a time stamp corresponding to when the third transfer 262 occurs. The time stamp can be used to uniquely identify the transfer. For example, if multiple copies of the document are created, each copy can have provable provenance back to the original document. For instance, if an art gallery is the offeror 202 and made multiple copies of a digital image from an artist in the gallery, each copy can be traced back to that art gallery, and the time stamp can show when the third transfer 262 occurred between the art gallery offeror 202 and the offeree 204 approving the transfer certificate.

In another implementation, the offer created by the offeror (block 210) can have information associated with the equipment used to create or capture the document. For example, an offer for a digital image can have information to allow the digital image to be traced back to a camera that captured the digital image. In another example, the offer may have information for a name of a computer (e.g., "Computer_123_company_name") that edited the document prior to the offer being made (e.g., prior to the first transfer 222).

As the document is passed from one controller to another, there may be other controls and conditions for the document that can be traced back to an original controller. For example, a controller may not have the ability to pass on more control that the controller has been given.

Over time, there can be a chain of document controllers, in which each controller is or has been a participant in the chain of transfer of the document. The original controller can be the author of the document. In adding the first controllers to the chain of transfer, the author and a subsequent controller are added to the chain of transfer when the transfer certificate is formed (block 260).

In one implementation, a offeror certificate includes a copy of the document. In another implementation, the document or a copy of the document is sent to the offeree 204 when the transfer certificate is sent to the offeree (block 262). Alternatively, the document or a copy of the document can be sent to the offeree 204 at some time after the transfer certificate is sent to the offeree (block 262).

In one implementation, the Public Key Infrastructure (PKI) is used for creating, registering, and distributing private and public key pairs to one or more controllers. The private key can be used by a controller to encrypt an offer or approval of an offer. The public key associated with the private key can be used by anyone to decrypt the offer or approval of the offer. Each entity has associated public and private key for certificates.

The offeror certificate includes a fingerprint of the document, e.g., an identifying characteristic of the document, such as an electronic tag, which can allow the document to be uniquely identified (block 214). Any number of fingerprinting techniques can be used. For example, the fingerprint can be based on the size and modification date of the document. Alternatively, the fingerprint can be a hash of the content of key data items of the document. The hash of the content can allow the fingerprints of copies of the document to be compared when the document has been created from and modified by different systems. In one example, an MD5 hash can be used as a technique to generate an accurate and nearly-unique fingerprint. In another example, a chain of MD5 hash keys can be traced back to the author of the document.

Figure 2:
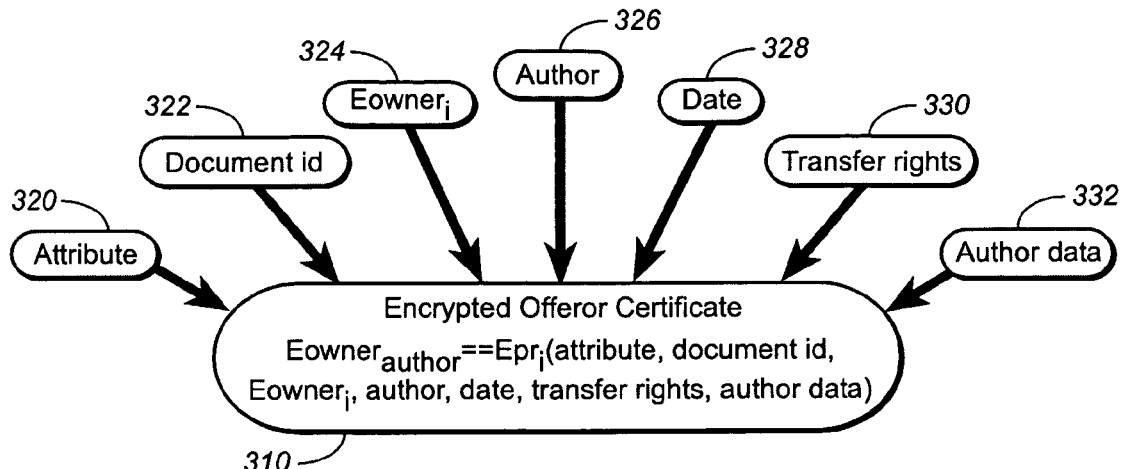
FIG. 2 shows an encrypted offeror certificate.

FIG. 2 shows an exemplary encrypted offeror certificate as described with respect to FIG. 1. The offeror 202 creates the offeror certificate (block 210). An offeror certificate can be constructed when an offer is created (block 210), in which the encrypted offeror certificate $E_{author}$ is calculated as follows: $E_{author}=Epr_{author}$(attribute, document id, $Eowner_{author}$, author, date, transfer rights, author-data), where $Epr_i(\ldots)$ refers to the private key encryption function for the $i^{th}$ controller and $Eowner_i=Epr_i(owner_i)$, e.g., in this case $Eowner_{author}=Epr_{author}(owner_{author})=Epr_{author}$(author), where owners is a value identifying the $i^{th}$ owner. The "attribute" 320 refers to a characteristic of the document that can be affected by the transfer, such as a document source name. The "document id" 322 refers to a document identifier or a unique or near-unique document identifier such as a MD5 hash of the document. The "author" 326 refers to a name of the author of the document. The "author" may also be a private key encoded name of the author and can imply that the author agrees that she is the true author of the document. The "date" 328 refers to the date that the document was created or readied for the first transfer 222 in FIG. 1. The "transfer rights" 330 define the rights and scope of the transfer. For example, the transfer rights may specify that the transfer is either exclusively transferable, meaning that all of the property rights are transferred completely and cannot be transferred to others, or non-exclusively transferable, meaning that other copies may be transferred. The "author-data" 332 refers to any other author data the author may want to pass forward in the certificate, such as an e-mail address for the author.

Figure 3:
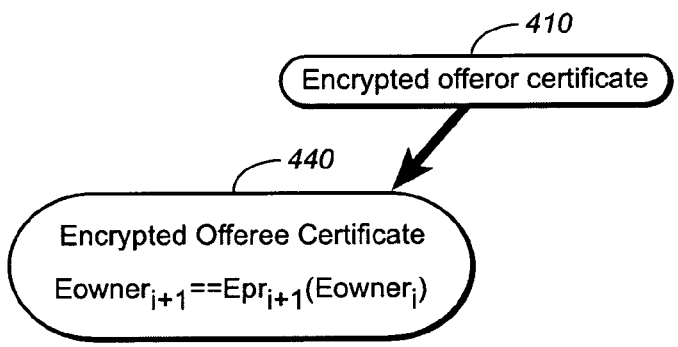
FIG. 3 shows an encrypted offeree certificate.
Figure 4:
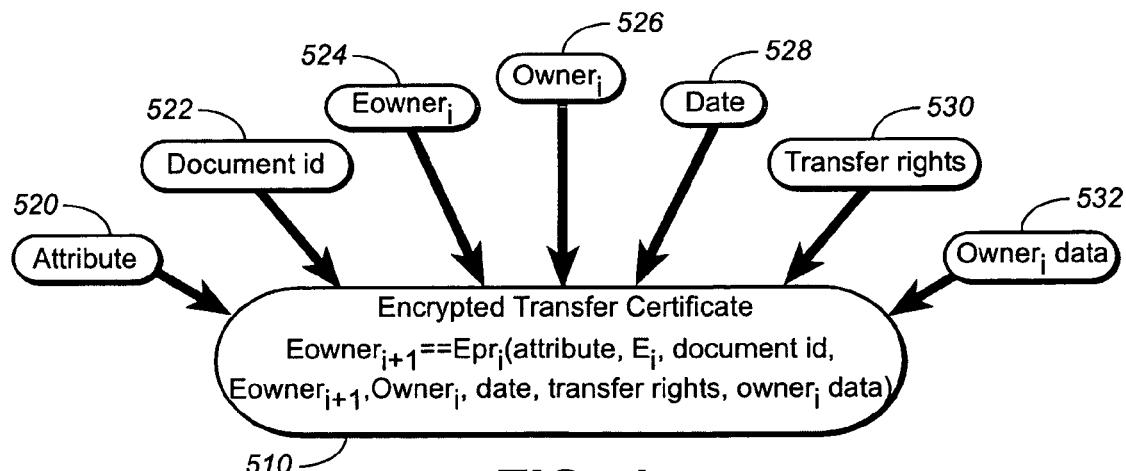
FIG. 4 shows an encrypted transfer certificate.

FIG. 3 shows an encrypted offeree certificate, and FIG. 4 shows an encrypted transfer certificate as described with respect to FIG. 1. When an offeror 202 with a document and an encrypted offeror certificate 310 wishes to transfer the encrypted offeror certificate to a subsequent controller (offeree 204), the following process may occur. The encrypted offeror certificate is transferred (block 222) to the offeree 204. The offeree 204 builds an offeree certificate by encrypting the offeror certificate (410) and the conditions of the offer with the private key of the offeree (block 240). The offeree 204 computes the offeree certificate $Eowner_{i+1}$ as follows: $Eowner_{i+1}=Epr_{i+1}(Eowner_i)$, and transfers (block 242) the encrypted offeree certificate to the current owner showing that the offeree 204 has checked the offeror's certificate for validity and non-repudiateably approves of the certificate, document and/or conditions of the transfer.

The offeror 202 receives the offeree certificate from the offeree 204 and computes the transfer certificate with the private key of the offeror 202. The transfer certificate can be based on the offeree certificate of the offeree 204. The transfer certificate $E_{i+1}$ is calculated (block 260) as follows: $E_{i+1}=Epr_i$(attribute, $E_i$, document id, $Eowner_{i+1}$, $owner_i$, date, transfer-rights, $owner_i$-data), and the transfer certificate is transferred (block 262) to the offeree 204, thereby adding the offeree to the chain of transfer. The offeree 204 cannot forge $E_i$, but can verify it publicly, and by making the certificate public, other entities can also verify the certificate (block 270). The offeree 204 cannot forge $E_i$ because only the previous controller's private key could have created $E_i$.

In one example of the process shown in FIG. 1, a certificate after the third transfer (block 262) is $E_1=Epr_{author}$(attribute, $E_{author}$, document id, $Eowner_1$, $owner_{author}$, date, transfer-rights, $owner_{author}$-data). In this example, the $1^{st}$ controller in the transfer cannot forge the certificate because the certificate can only be decrypted by using the public key of the author. Also, the $1^{st}$ controller has irrevocably approved control, as indicated by $Eowner_1$. Because only private keys are used for encryption, the certificate is publicly verifiable by a corresponding public key in the key pair.

In another example of the process shown in FIG. 1, a certificate after the third transfer (block 262) is calculated as follows: $E_{i+1}=Epr_i$(attribute, $E_i$, document id, $Eowner_{i+1}$, $owner_i$, date, transfer-rights, $owner_i$-data).

In this example, $E_i$ cannot be forged and cannot be repudiated. Only the $i^{th}+1$ controller could have created $Eowner_{i+1}$ and approved the certificate. Hence, the $i^{th}+1$ controller is not allowed to repudiate the transfer. Because $E_{i+1}$ is privately encrypted by $Epr_i(\ldots)$, the certificate created by the $i^{th}$ controller can have information to show that the transfer (222) was made to the $i^{th}+1$ controller. $E_{i+1}$ is linked to the document at the time when the offer was created (block 210). $E_{i+1}$ may also include conditions on the offer such as a fulfillment date, a price, or a condition of sale. The agreed-upon conditions of the certificates can also be publicly verifiable. In one implementation, the offer can also include the document, in which the document may have one or more control limitations. The information in the encrypted transfer certificate 510 may be similar to the information in the encrypted offeror certificate 310, with the exceptions of the changes and updates in the chain of transfer, the approved transfer conditions, and other information related to or identifying the offeror or offeree.

Thus for any chain of transfer that follows the process shown in FIG. 1, a chain of transfer can be produced that is publicly verifiable and impossible to be successfully forged or repudiated. In one aspect, a PKI infrastructure can be used to associate a digital signature with a document by proving that only a controller of a PKI key pair could have "signed" the document.

In one implementation, the process shown in FIG. 1 can be performed automatically. A sending device, which can be the offeror or a device used by the offeror, can exchange certificates with a receiving device, which can be the offeree or a device used by the offeree, according to a protocol. For example, the sending device can generate the offeror certificate automatically using stored information associated with the offeror and the digital document, encrypt the offeror certificate with the offeror's private key, and send the offeror certificate to the receiving device without human intervention. Upon receiving the offeror certificate, the receiving device automatically obtains the offeror's public key and verifies the offeror certificate. The receiving device can also obtain the public key of previous controller(s) of the document to verify the offeror certificate. After verifying the offeror certificate, the receiving device automatically generates an offeree certificate using the offeror certificate and stored information about the offeree, encrypts the offeree certificate with the offeree's private key, and sends the offeree certificate back to the sending device. Upon receiving the offeree certificate, the sending device automatically verifies the offeree certificate with the offeree's public key, generates and encrypts the transfer certificate, and sends the transfer certificate to the receiving device. In this manner a completely automated chain of transfer can be accomplished that is not forgeable and cannot be repudiated. The automated transfers can be publicly verified by any device that can check the transfer chain.

The disclosed techniques can be used to prevent fraudulent transactions, such as "phishing". Phishing is a form of identity theft that utilizes the Internet and/or electronic forms and can lead to actual theft. The "phisher" seeks to obtain an individual's private information by posing as a trusted business associate and then requests that the individual update key information usually held by the trusted business associate in the course of their business relationship. The phisher uses some business event as the reason for updating the information.

Phishing is generally performed by sending out an email that behaves as though the message is from the trusted business associate such as a bank. The email explains that some event such as a security attack has occurred and that the person needs to update or verify this key information. The person is directed to a fake web site that spoofs the actual web site and asks the user to fill out a form by filling in the key information. The key information usually takes the form of the person's full name, address, account number, password, credit card number, bank account number and pin, etc. An unsuspecting user will fill in this information and the phisher immediately uses it to drain the account or to purchase goods and services using the information obtained.

Another form of phishing uses intelligent documents such as those using the Acrobat Reader 6.1, produced by Adobe Systems Inc. A form can be constructed that externally looks like, for example, an on-line interactive form such as a credit card application or a mortgage application from a trusted institution (e.g., a bank). The form requests private information such as full identity disclosure, other bank account numbers, etc. The form document can be sent either in an email or via a CD to a large number of people who are likely to have a trusted relationship with the trusted institution. The email (or direct mail) again asks the recipient to update their information by filling out the attached form, or on the enclosed CD. This information can be electronically sent, not to the trusted institution, but to the entity that created the form, thus essentially providing a means using the Internet via email or direct mail but not having to go through the expense or trouble of creating a web site.

Both of these forms of phishing can be prevented by having the digital documents (email, web page, electronic form) include a verifiable chain of transfer from the user to the trusted business associate and also a verifiable chain of transfer of web pages from the trusted business associate accessible from available web page servers. This can be performed automatically using a protocol over the Internet or manually.

In an implementation, phishing using fake web sites can be prevented by providing a mechanism to implement transfer certificate verification in the browser and email program in use. When delivered a transfer certificate constructed as described in FIG. 4, the browser or email program verifies each transferee in the chain of transfer. The chain of transfer can be as short as the first entity creating the initial certificate (for the email or web page) to an arbitrary sequence of transfers. It does this by validating each transferee as well as validating the conditions for the transfer (to assure the conditions are met). The transferee can be either an email transfer server (such as SendMail or Exchange Server) or a web page caching server (such as Akamai Edge Platform) as long as each has a private/public key pair so that each transfer can be validated and verified. A transfer is validated by determining that an association between the transferee and the public key encryption key pair exists and verified by using the public keys to determine the content of the encrypted information.

The following describes an exemplary process for preventing phishing using transfer certificate verification. An email is received that is purported to be from, say, eBay, requesting that the person update account information. To determine if the email is actually from eBay, the person exercises a validation procedure as follows. The person is asked to type in the name of the institution to validate against. This is done to make sure that the name is really "eBay" and not, say, "aBay". The product (email program or browser) uses the typed name to identify and validate the institution. This can be done by a lookup of the name using a well known and trusted mechanism, e.g. DNS resolution, an automatic URL generated from the name, or another Internet lookup from a trusted authority. If the institution cannot be found, the email is determined to be a phishing exploit. The found institution's logo can be shown along with the typed name to further verify the intended institution.

An MD5 hash of the body of the email is computed and used to find the associated transfer certificate at the trusted institution or to validate the transfer certificate if it is included in the email as an attachment. If no certificate is found or is invalid, the email is determined to be a phishing exploit. This step is done to separate control of sending mail from control of transfer certificate generation, making it more difficult for an insider at the institution to betray it.

The chain of transfer in the transfer certificate is either verified, proving that the email originated from the trusted institution, or it fails and the email is determined to be a phishing exploit. For extremely important messages, each store and forward server can be registered in the transfer chain proving a complete chain of custody of the message.

The verified email directs the user to a web page. The web page is retrieved and the MD5 hash of the page is computed. The transfer certificate is looked up using the trusted mechanism described above to retrieve the transfer certificate and/or validate it. Again, failure here indicates a phishing exploit. The transfer certificate is verified proving that the web page came from the trusted institution and that it can be safely used. If verification fails, clearly the web page form should not be completed.

Phishing using intelligent documents can be prevented in a similar manner by providing a mechanism to implement transfer certificate verification in the form manager (e.g. Acrobat Reader). A document claiming to be a form is always both validated and verified. In this case, the user's trusted institution provides transfer certificate generation services for verifiable documents that it wants its customers and distributors to use. This means, for example, that a large mortgage service may permit it's forms to be used by a regional distributor which in turn lets its forms be used by a local retail mortgage broker. The provenance transfer chain provably assures the end user that they are dealing with the highly reputable mortgage service. Each step in the distribution chain of the form is registered in the provenance chain so that phishing is not possible.

The disclosed techniques and all of the functional operations described in this specification can be implemented in digital electronic circuitry, or in computer software, firmware, or hardware, including the structural means disclosed in this specification and structural equivalents thereof, or in combinations of them. The disclosed techniques can be implemented as one or more computer program products, i.e., one or more computer programs tangibly embodied in an information carrier, e.g., in a machine-readable storage device for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments, but other embodiments can be implemented and are within the scope of the following claims. As one example, the process depicted in FIG. 1 does not require the particular order shown, or sequential order, to achieve desirable results. For instance, the offer sent from the offeror 202 to an offeree 204 can include one or more conditions that are voluntary and/or one or more conditions that are mandatory to approve the offer. In one implementation, the offeror certificate does not include the chain of transfer information. In this implementation, the chain of transfer information is included when the transfer certificate is created. Alternatively, the offeror certificate does not include chain of transfer information when the author creates the offeror certificate. Also, the certificate does not necessarily need to be associated with a document, but may contain in itself contractual rights that can be transferred while creating a verifiable chain of transfer. Other embodiments are within the scope of the following claims.

What is claimed is:

1. A computer program product, tangibly stored on a computer-readable medium, comprising instructions to cause a programmable processor to:

generate a first entity certificate associated with a digital document;

encrypt the first entity certificate with a private key of a first entity;

select at least one entity from at least two entities for direct transmittal of the encrypted first entity certificate;

transmit the encrypted first entity certificate directly to a second entity;

receive a second entity certificate at the first entity, the second entity certificate including the encrypted first entity certificate and being encrypted with a private key of the second entity;

add the second entity to a chain of transfer of the digital document;

generate a transfer certificate from the second entity certificate;

encrypt the transfer certificate with the private key of the first entity; and transmit the transfer certificate to the second entity, wherein the first entity certificate includes a unique identifier identifying the digital document.

2. The computer program product of claim 1, wherein the first entity certificate identifies the chain of transfer to which the second entity is added.

3. The computer program product of claim 1, wherein the instructions to add the second entity to the chain of transfer comprise instructions to include the encrypted second entity certificate in the transfer certificate, thereby making the transfer certificate verifiable with a public key associated with the private key of the first entity and a public key associated with a public key associated with the private key of the second entity.

4. The computer program product of claim 1, wherein the chain of transfer identifies each of one or more previous controllers of the digital document.

5. The computer program product of claim 4, wherein the first entity certificate includes information encrypted with the private key of each of the one or more previous controllers of the document.

6. The computer program product of claim 5, wherein the chain of transfer is verifiable with public keys associated with the private keys of the first entity and each of the one or more previous controllers of the digital document.

7. The computer program product of claim 1, wherein the unique identifier comprises an electronic tag.

8. The computer program product of claim 7, wherein the unique identifier comprises a hash of the digital document.

9. The computer program product of claim 1, wherein the first entity certificate includes conditions of an offer for transference of control of the digital document.

10. The computer program product of claim 1, wherein the first entity certificate includes a previous transfer certificate encrypted with a private key of a previous controller of the document.

11. The computer program product of claim 10, wherein the previous transfer certificate includes a previously approved offer encrypted with the private key of the first entity.

12. A computer program product, tangibly stored on a computer-readable medium, comprising instructions to cause a programmable processor at a second computer to:

receive from a first computer a first entity certificate at a second entity at the second computer that is associated with a digital document from a first entity, the first entity certificate identifying a chain of transfer of the digital document, wherein if the chain of transfer includes a first preceding entity in the chain of transfer that immediately preceded the first entity and a second preceding entity that immediately preceded the first preceding entity, the first and second preceding entities and the first and second entities are all different entities from each other;

generate at the second computer a second entity certificate from the first entity certificate;

encrypt at the second computer the second entity certificate with a private key of the second entity;

transmit the encrypted second entity certificate from the second computer to the first entity at the first computer; and receive from the first computer a transfer certificate from the first entity, the transfer certificate adding the second entity to the chain of transfer, wherein the first entity certificate includes a unique identifier identifying the digital document.

13. The computer program product of claim 12, wherein the transfer certificate is encrypted with a private key of the first entity, thereby making the transfer certificate verifiable with a public key associated with the private key of the first entity and a public key associated with a public key associated with the private key of the second entity.

14. The computer program product of claim 12, wherein the chain of transfer identifies each of one or more previous controllers of the digital document.

15. The computer program product of claim 14 wherein the first entity certificate is encrypted with the private key of the first entity and includes information encrypted with the private key of each of the one or more previous controllers of the document.

16. The computer program product of claim 15, wherein the chain of transfer is verifiable with public keys associated with the private keys of the first entity and each of the one or more previous controllers of the digital document.

17. The computer program product of claim 12, wherein the unique identifier comprises an electronic tag.

18. The computer program product of claim 17, wherein the unique identifier comprises a hash of the digital document.

19. The computer program product of claim 12, wherein the first entity certificate includes conditions of an offer for transference of control of the digital document.

20. The computer program product of claim 12, further comprising instructions to cause the programmable processor at the second computer to:
  generate at the second computer another second entity certificate associated with the digital document, said another second entity certificate identifying the chain of transfer of the digital document;
  encrypt at the second computer said another second entity certificate with the private key of the second entity;
  select at the second computer at least one entity from at least two entities for direct transmittal of the encrypted another second entity certificate;
  transmit from the second computer said encrypted another second entity certificate directly to a third entity at a third computer;
  receive from the third computer a third entity certificate, the third entity certificate including the encrypted said another second entity certificate and being encrypted with a private key of the third entity;
  add at the second computer the third entity to the chain of transfer;
  generate at the second computer a second transfer certificate from the third entity certificate;
  encrypt at the second computer the second transfer certificate with the private key of the second entity; and
  transfer from the second computer the second transfer certificate to the third entity at the third computer.

21. A system comprising:
  a first computer including a first programmable processor and a first computer program product, tangibly stored on a computer-readable medium, comprising instructions to cause the first programmable processor to:
    generate a first entity certificate associated with a digital document,
    encrypt the first entity certificate with a private key of a first entity,
    select at least one entity from at least two entities for direct transmittal of the encrypted first entity certificate,
    transmit the encrypted first entity certificate directly to a second entity at a second computer;
    receive a second entity certificate, the second entity certificate including the encrypted first entity certificate and being encrypted with a private key of the second entity;
    add the second entity to a chain of transfer of the digital document,
    generate a transfer certificate from the second entity certificate,
    encrypt the transfer certificate with the private key of the first entity, and
    transmit the transfer certificate to the second computer; and
  the second computer, including a second programmable processor and a second computer program product, tangibly stored on a computer-readable medium, comprising instructions to cause the second programmable processor to:
    receive the first entity certificate from the first computer,
    generate the second entity certificate from the first entity certificate,
    encrypt the second entity certificate with the private key of the second entity,
    transmit the encrypted second entity certificate to the first computer, and
    receive the transfer certificate from the first computer,
  wherein the first entity certificate includes a unique identifier identifying the digital document.

22. A system comprising:
  means for generating a first entity certificate associated with a digital document;
  means for encrypting the first entity certificate with a private key of a first entity;
  means for selecting at least one entity from at least two entities for direct transmittal of the encrypted first entity certificate;
  means for transmitting the encrypted first entity certificate directly to a second entity;
  means for receiving a second entity certificate at the first entity, the second entity certificate including the encrypted first entity certificate and being encrypted with a private key of the second entity;
  means for adding the second entity to a chain of transfer of the digital document;
  means for generating a transfer certificate from the second entity certificate;
  means for encrypting the transfer certificate with the private key of the first entity; and
  means for transmitting the transfer certificate to the second entity,
  wherein the first entity certificate includes a unique identifier identifying the digital document.

23. The system of claim 22, wherein the first entity certificate identifies the chain of transfer of the digital document to which the second entity is added.

24. The system of claim 22, further comprising means for including the encrypted second entity certificate in the transfer certificate, thereby making the transfer certificate verifiable with a public key associated with the private key of the first entity and a public key associated with a public key associated with the private key of the second entity.

25. The system of claim 22, wherein the chain of transfer identifies each of one or more previous controllers of the digital document.

26. The system of claim 25, wherein the first entity certificate includes information encrypted with the private key of each of the one or more previous controllers of the document.

27. The system of claim 26, wherein the chain of transfer is verifiable with public keys associated with the private keys of the first entity and each of the one or more previous controllers of the digital document.

28. The system of claim 22, wherein the unique identifier comprises an electronic tag.

29. The system of claim 28, wherein the unique identifier comprises a hash of the digital document.

30. The system of claim 22, wherein the first entity certificate includes conditions of an offer for transference of control of the digital document.

31. The system of claim 22, wherein the first entity certificate includes a previous transfer certificate encrypted with a private key of a previous controller of the document.

32. The system of claim 31, wherein the previous transfer certificate includes a previously approved offer encrypted with the private key of the first entity.

33. A system comprising:
means for receiving a first entity certificate at a second entity that is associated with a digital document from a first entity, the first entity certificate identifying a chain of transfer of the digital document, wherein if the chain of transfer includes another entity in the chain of transfer that immediately preceded the first entity, the other entity in the chain differs from the second entity;
means for generating a second entity certificate from the first entity certificate;
means for encrypting the second entity certificate with a private key of the second entity;
means for transmitting the encrypted second entity certificate to the first entity; and
means for receiving a transfer certificate from the first entity, the transfer certificate adding the second entity to the chain of transfer,
wherein the first entity certificate includes a unique identifier identifying the digital document.

34. The system of claim 33, wherein the transfer certificate is encrypted with a private key of the first entity, thereby making the transfer certificate verifiable with a public key associated with the private key of the first entity and a public key associated with a public key associated with the private key of the second entity.

35. The system of claim 33, wherein the chain of transfer identifies each of one or more previous controllers of the digital document.

36. The system of claim 35 wherein the first entity certificate is encrypted with the private key of the first entity and includes information encrypted with the private key of each of the one or more previous controllers of the document.

37. The system of claim 36, wherein the chain of transfer is verifiable with public keys associated with the private keys of the first entity and each of the one or more previous controllers of the digital document.

38. The system of claim 33, wherein the unique identifier comprises an electronic tag.

39. The system of claim 38, wherein the unique identifier comprises a hash of the digital document.

40. The system of claim 33, wherein the first entity certificate includes conditions of an offer for transference of control of the digital document.

41. The system of claim 33, further comprising:
means for generating another second entity certificate associated with the digital document, said another second entity certificate identifying the chain of transfer of the digital document;
means for encrypting said another entity certificate with the private key of the second entity;
means for selecting at least one entity from at least two entities for direct transmittal of the encrypted another second entity certificate;
means for transmitting the encrypted said encrypted another second entity certificate to a third entity;
means for receiving a third entity certificate, the third entity certificate including the encrypted said another second entity certificate and being encrypted with a private key of the third entity;
means for adding the third entity to the chain of transfer;
means for generating a second transfer certificate from the third entity certificate;
means for encrypting the second transfer certificate with the private key of the second entity; and
means for transferring the second transfer certificate to the third entity.

42. A method implemented in a computer program application, the method comprising:
with a first computer,
generating a first entity certificate associated with a digital document;
encrypting the first entity certificate with a private key of a first entity;
selecting at least one entity from at least two entities for direct transmittal of the encrypted another second entity certificate;
transmitting the encrypted first entity certificate directly to a second entity at a second computer;
receiving a second entity certificate from the second computer, the second entity certificate including the encrypted first entity certificate and being encrypted with a private key of the second entity;
adding the second entity to a chain of transfer of the digital document;
generating a transfer certificate from the second entity certificate;
encrypting the transfer certificate with the private key of the first entity; and transmitting the transfer certificate to the second entity,
wherein the first entity certificate includes a unique identifier identifying the digital document.

43. The method of claim 42, wherein the first entity certificate identifies the chain of transfer to which the second entity is added.

44. The method of claim 42, wherein the addition of the second entity to the chain of transfer includes the encrypted second entity certificate in the transfer certificate, thereby making the transfer certificate verifiable with a public key associated with the private key of the first entity and a public key associated with a public key associated with the private key of the second entity.

45. The method of claim 42, wherein the chain of transfer identifies each of one or more previous controllers of the digital document.

46. The method of claim 45, wherein the offeror first entity certificate includes information encrypted with the private key of each of the one or more previous controllers of the document.

47. The method of claim 46, wherein the chain of transfer is verifiable with public keys associated with the private keys of the first entity and each of the one or more previous controllers of the digital document.

48. The method of claim 42, wherein the unique identifier comprises an electronic tag.

49. The method of claim 48, wherein the unique identifier comprises a hash of the digital document.

50. The method of claim 42, wherein the first entity certificate includes conditions of an offer for transference of control of the digital document.

51. The method of claim 42, wherein the first entity certificate includes a previous transfer certificate encrypted with a private key of a previous controller of the document.

52. The method of claim 51, wherein the previous transfer certificate includes a previously approved offer encrypted with the private key of the first entity.

53. A method implemented in a computer program application, the method comprising:
   receiving from a first computer a first entity certificate at a second entity at a second computer that is associated with a digital document from a first entity, the first entity certificate identifying a chain of transfer of the digital document, wherein if the chain of transfer includes another entity in the chain of transfer that immediately preceded the first entity, the other entity in the chain differs from the second entity;
   generating at the second computer a second entity certificate from the first entity certificate;
   encrypting at the second computer the second entity certificate with a private key of the second entity;
   transmitting the encrypted second entity certificate from the second computer to the first entity at the first computer; and
   receiving from the first computer a transfer certificate from the first entity, the transfer certificate adding the second entity to the chain of transfer,
   wherein the first entity certificate includes a unique identifier identifying the digital document.

54. The method of claim 53, wherein the transfer certificate is encrypted with a private key of the first entity, thereby making the transfer certificate verifiable with a public key associated with the private key of the first entity and a public key associated with a public key associated with the private key of the second entity.

55. The method of claim 53, wherein the chain of transfer identifies each of one or more previous controllers of the digital document.

56. The method of claim 55, wherein the first entity certificate is encrypted with the private key of the first entity and includes information encrypted with the private key of each of the one or more previous controllers of the document.

57. The method of claim 56, wherein the chain of transfer is verifiable with public keys associated with the private keys of the first entity and each of the one or more previous controllers of the digital document.

58. The method of claim 53, wherein the unique identifier comprises an electronic tag.

59. The method of claim 58, wherein the unique identifier comprises a hash of the digital document.

60. The method of claim 53, wherein the first entity certificate includes conditions of an offer for transference of control of the digital document.

61. The method of claim 53, further comprising:
at the second computer
   generating another second entity certificate associated with the digital document, said another second entity certificate identifying the chain of transfer of the digital document;
   encrypting said another second entity certificate with the private key of the second entity;
   selecting at least one entity from at least two entities for direct transmittal of the encrypted another second entity certificate;
   transmitting said encrypted another second entity certificate from the second computer directly to a third entity at a third computer;
   receiving a third entity certificate from the third computer, the third entity certificate including the encrypted another second entity certificate and being encrypted with a private key of the third entity;
   adding the third entity to the chain of transfer;
   generating a second transfer certificate from the third entity certificate;
   encrypting the second transfer certificate with the private key of the second entity; and
   transferring the second transfer certificate from the second computer to the third entity at the third computer.

62. A method comprising:
with a first computer,
   generating a first entity certificate associated with a digital document,
   encrypting the first entity certificate with a private key of a first entity,
   selecting at least one entity from at least two entities for direct transmittal of the encrypted first entity certificate;
   transmitting the encrypted first entity certificate directly to a second entity at a second computer,
   receiving a second entity certificate, the second entity certificate including the encrypted first entity certificate and being encrypted with a private key of the second entity;
   adding the second entity to a chain of transfer of the digital document,
   generating a transfer certificate from the second entity certificate,
   encrypting the transfer certificate with the private key of the first entity, and
   transmitting the transfer certificate to the second computer; and with a second computer,
   receiving the first entity certificate from the first computer,
   generating the second entity certificate from the first entity certificate,
   encrypting the second entity certificate with the private key of the second entity,
   transmitting the encrypted second entity certificate to the first computer, and receiving the transfer certificate from the first computers
wherein the first entity certificate includes a unique identifier identifying the digital document.

* * * * *

UNITED STATES PATENT AND TRADEMARK OFFICE
CERTIFICATE OF CORRECTION

PATENT NO.         : 7,660,981 B1                                             Page 1 of 1
APPLICATION NO.    : 11/001711
DATED              : February 9, 2010
INVENTOR(S)        : Bruce Hunt It is certified that error appears in the above-identified patent and that said Letters Patent is hereby corrected as shown below:

Column 14, line 62, in claim 46, delete "offeror".

Column 16, line 2, in claim 61, delete "computer" and insert --computer,--.

Column 16, line 57, in claim 62, delete "computers" and insert --computer,--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,981 B1
APPLICATION NO. : 11/001711
DATED : February 9, 2010
INVENTOR(S) : Bruce Hunt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Thirtieth Day of November, 2010

David J. Kappos
*Director of the United States Patent and Trademark Office*